United States Patent Office 3,555,457
Patented Jan. 12, 1971

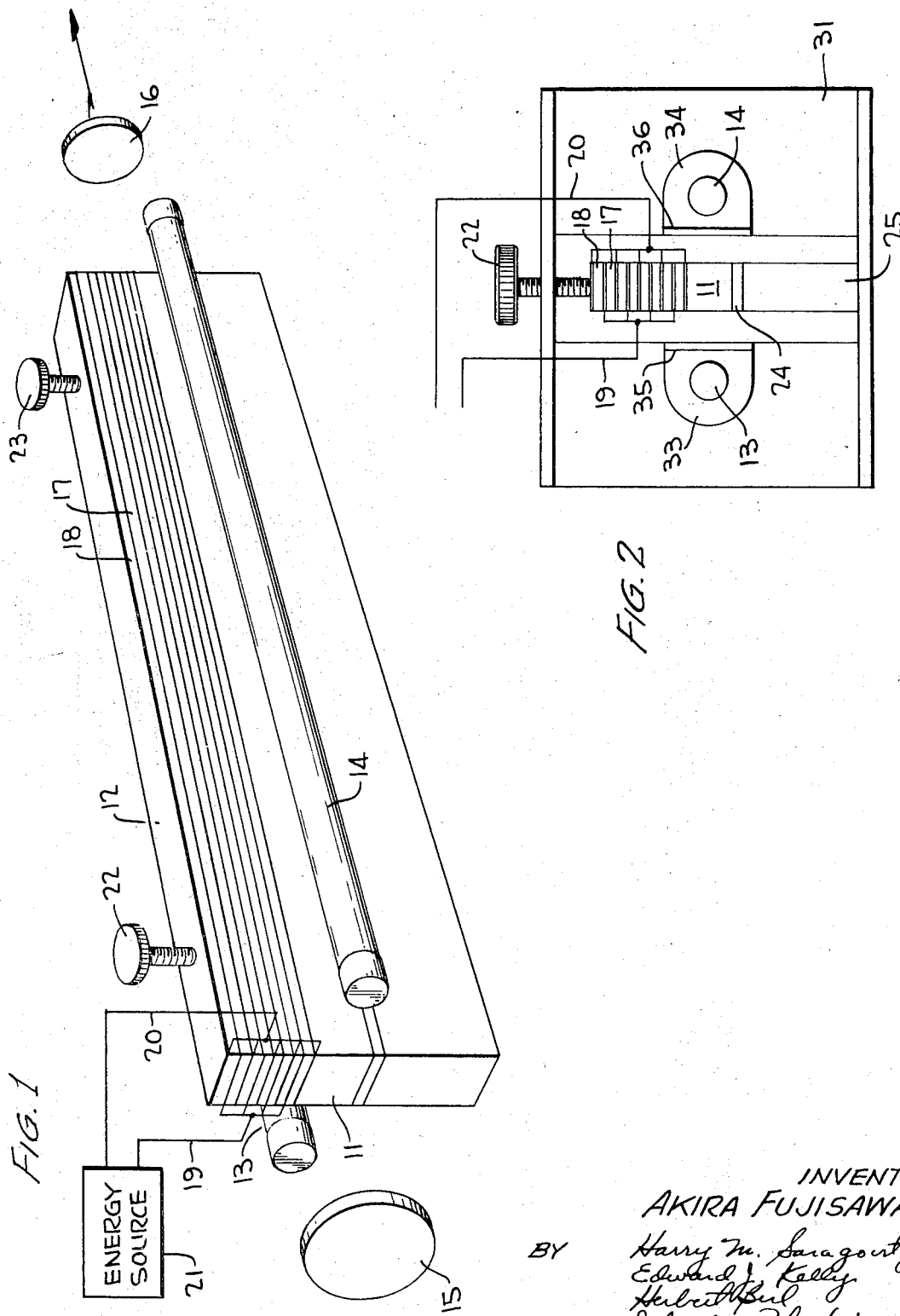

3,555,457
MODULATED LASER DEVICE
Akira Fujisawa, Fort Belvoir, Va., assignor to the United States of America as represented by the Secretary of the Army
Filed Mar. 27, 1967, Ser. No. 626,669
Int. Cl. H01s 3/10
U.S. Cl. 332—7.51   1 Claim

ABSTRACT OF THE DISCLOSURE

This invention is a modulated laser device wherein means are provided for subjecting the laser rod to a transverse forced vibration along its entire length. The transverse forced vibration affords a change in index of refraction of the laser rod and this change in index of refraction alters the effective length of the cavity.

By varying the frequency of the transverse forced vibration in accordance with modulation information, the effective length of the cavity may be varied in accordance with the modulation information. It has been found that this invention enables modulation over a band of frequencies.

Many modern gating devices, especially those designed for use in viewing equipment require a pulsed light source capable of operation with a pulse duration one microsecond or less. It has been found that laser beam gating devices will function at such speeds and it is now common practice to utilize such devices for this purpose. Prior art gating devices of this variety generally employ longitudinal, radial, or whip vibration of the rod, or alternatively, an acoustic modulation of the mirror surfaces.

Each of the above mentioned prior art laser beam modulation techniques which acts directly on the rod, is dependent upon changes in the associated resonant optical cavity in order to achieve modulation and hence require high magnitude acoustic driving signals. Such magnitudes are normally obtainable only at acoustic resonance. Thus the frequency of modulation in these prior art devices is determined by the design of the optical cavity and the gating rate is effectively established by the resonant acoustic frequency of the system.

It will be appreciated that in selected applications, especially in gated viewing applications, it may be desirable to change the gating rate in response to varying viewing circumstances. Thus, the need has developed for a laser beam modulation means which is variable over a band of frequencies. Moreover, it has been found that many modulation applications necessitate a substantial reduction in size, weight, and driving signal requirements.

Accordingly, it is an object of this invention to provide a new and improved means for modulating the laser beam output of solid gas or liquid laser devices.

It is another object of this invention to provide a means for modulating the laser beam output of optically pumped electron injection type laser devices.

It is also an object of this invention to provide a more sensitive laser beam modulation means.

It is a further object of this invention to provide a laser beam modulation means which is operative in response to a relatively low magnitude driving signal.

It is still another object of this invention to provide a laser beam modulation means wherein the modulation frequency can be varied within selected limits.

It is an additional object of this invention to provide a more compact modulated laser device.

Other objects of this invention become apparent upon a more complete understanding of the inventions for which reference is had to the following specification and drawings wherein:

FIG. 1 is a pictorial showing of the internal elements of one embodiment of the modulated laser beam device of this invention.

FIG. 2 is a more detailed cross sectional showing of the embodiment of FIG. 1 within its housing. Referring now to the drawings in more detail, FIG. 1 depicts a typical embodiment of the device of this invention in an optically pumped solid laser assembly wherein the laser rod 11, which may be doped neodymium glass ruby or any other active laser medium, has a rectangular cross section. While it is not essential to the basic concept of this invention that a laser rod having a rectangular cross section be employed, it has been found that this configuration enables an efficient mechanical coupling between the driving means, indicated at 12, and the laser rod 11.

In this embodiment, the laser rod 11, is excited in optically pumped fashion by means of a pair of elongated xenon gas lamps, 13 and 14, disposed in coadjacent relation with the laser rod 11 such that the entire length of the laser rod is subject to the excitation thereby. Likewise, the fully reflective mirror 15 and the partially reflective mirror 16 are disposed in a conventional manner at opposite ends of the laser rod 11 such that the laser beam is reflected therebetween and the output laser beam exits via the partially reflective mirror 16. It is understood, of course, that the mirror surfaces may be flat or curved, as desired.

In accordance with the invention the driving means 12 may comprise a plurality of parallel piezoelectric ceramic plates, indicated at 17, disposed in sandwich relation with a plurality of plate electrodes, indicated at 18, such that each ceramic plate may be energized by the application of a voltage thereacross by means of the parallel electrical connection, shown at 19 and 20 and an electrical energy source 21 having a relatively high frequency output, for example, 25 kc.

Upon energization by the high frequency energy source 21, each of the piezoelectric plates 17 expands and contracts in thickness at a rate determined by the output frequency of the energy source. The compound effect of the expansion and contraction of the plurality of plates in coadjacent relation is imparted to the laser rod 11 such that the laser rod expands and contracts in like manner at the same rate. For purposes of this disclosure the above described form of vibration of the laser rod is termed a transverse forced vibration.

FIG. 2 is a more detailed cross sectional showing of the embodiment of FIG. 1 in its housing 31. In FIG. 2, it will be noted that the driving means, made up of sandwiched plates 17 and 18, is directly affixed to the laser rod 11. It will be appreciated that the nature of the contiguous relation between the laser rod 11 and the driving means 12 determines the driving efficiency. The adjustment screws 22 and 23 are provided to compensate for surface variations between the two. It is understood, of course, that the adjustment screws are not essential to the device of this invention and may be omitted in some instances, dependent upon surface conditions and the efficiency requirement in each case.

In the showing of FIG. 2, the laser rod 11 is resting on an electromechanical detector element 24, which may be a piezoelectric ceramic plate similar to the ceramic plates indicated at 17, which is responsive to vibration of the laser rod. The detector element is mounted on a solid support member 25 which serves to position the laser rod 11 in proper relation to the xenon gas lamps 13 and 14. It will be appreciated that various types of detector elements may be employed and that the support member 15 may be of any material suitable for use in the particular environment, i.e., brass, Teflon type material, etc. It is understood, of course, that a detector element is especially useful in experimental or test apparatus but that in many applications the detector element is not necessary and may be omitted.

In accordance with this invention, the gas lamps 13 and 14 are disposed substantially at the focal point of parabolic reflector surfaces 33 and 34, respectively, to provide a broad line source form of excitation of the laser rod 11 which excites the rod along its entire length. In consideration of the known adverse effects of ultra-violet light, shielding means 35 and 36 are disposed between the laser rod and the gas lamps 13 and 14, respectively. It will be appreciated, of course, that ultra-violet shielding means may not be necessary in selected applications and in such instances may be omitted, if desired.

It has been found that by modulating the laser rod in the manner illustrated, it is possible to energize the laser rod such that the overall size of the structure can be substantially reduced. As a consequence, the device of this invention is especially adaptable to miniature weapon scope applications. More particularly, the variable frequency modulation means of this invention permits compensation for changes in target range, target dimension, lighting, etc., in such weapon scope applications. It has been found that the laser beam modulation means of this invention affords not only a variable frequency output but also a reliable constant shape and constant amplitude pulse output as the frequency is varied.

It will be appreciated that the exemplary embodiment shown in the drawings is illustrative of a preferred structure of the invention and that this depicted embodiment may be modified and otherwise adapted, as needed, to meet requirements in selected gating applications. Moreover, it will be appreciated that the device of this invention may be utilized in applications other than gating applications, if desired, and that in such instances also, appropriate modifications are within the purview of this disclosure.

Finally, it is understood that this invention is restricted only by the scope of the claim appended hereto.

I claim:
1. A frequency modulated laser device comprising a rod of a material capable of laser action and having at least one flat side surface, means for supporting laser action in said rod, means for energizing said rod such that laser action is generated therein and a wave energy output of the laser variety is produced thereby, and elongated means for producing a transverse forced vibration in said rod, said elongated means having at least one flat side surface, said elongated means disposed with the flat side surface thereof in contiguous relation with said flat surface of said rod, said elongated means comprising a plurality of piezoelectric plates and a plurality of electrode plates in sandwich relation such that each of said piezoelectric plates may be electrically energized and variable frequency means for electrical energization of said piezoelectric plates such that said elongated means exerts a transverse force on said flat surface of said rod and said rod is mechanically expanded and contracted substantially along its full length in accordance with the output frequency of said means for electrical energization and said wave energy output produced by laser action is modulated at the frequency of said transverse forced vibration of said rod.

References Cited

UNITED STATES PATENTS

| | | | |
|---|---|---|---|
| 3,297,876 | 1/1967 | De Maria | 332—7.51 |
| 3,354,407 | 11/1967 | Howling | 331—94.5 |
| 3,432,221 | 3/1969 | Harris et al. | 331—94.5 |
| 3,330,957 | 7/1967 | Runnels | 250—199 |

JOHN KOMINSKI, Primary Examiner

D. R. HOSTETTER, Assistant Examiner

U.S. Cl. X.R.

331—94.5